T. R. MARKILLIE.
Churn.
No. 33,154. Patented Aug. 27, 1861.
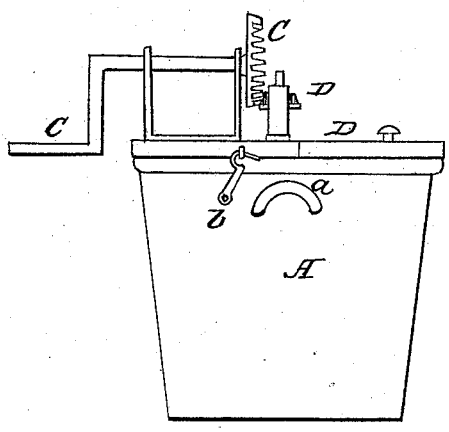
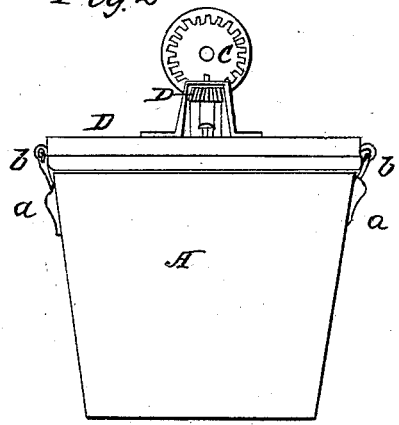
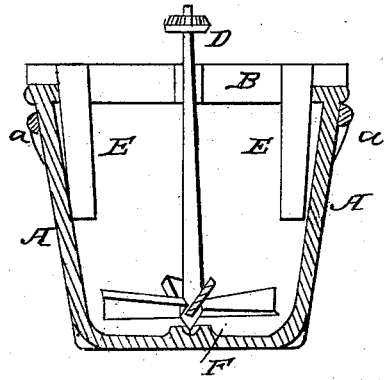
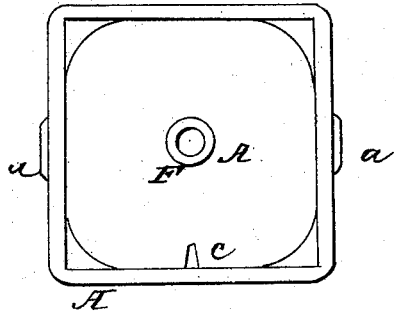
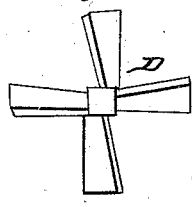

UNITED STATES PATENT OFFICE.

THOMAS R. MARKILLIE, OF WINCHESTER, ILLINOIS.

IMPROVEMENT IN CHURNS.

Specification forming part of Letters Patent No. 33,154, dated August 27, 1861.

*To all whom it may concern:*

Be it known that I, THOMAS R. MARKILLIE, of the town of Winchester, Scott county, in the State of Illinois, have invented a new and useful Churn; and I do hereby declare that the following is a full and exact description thereof, reference being had to the accompanying drawings, and to the letters of reference marked thereon.

In the drawings, Figure 1 is a side elevation. Fig. 2 is the opposite side in elevation. Fig. 3 is a vertical section. Fig. 4 is a plan view. Fig. 5 is the dasher.

To enable those skilled in the art to make and use my invention, I will describe its construction and operation.

Similar characters refer to like parts.

A is the earthenware cream-vessel; $a$, the lugs by which it is lifted from place to place.

$b\,b$ are the hooks for fastening the lid to vessel A; B, the lid, half of which is attached to the vessel, while the other half is merely lifted off; C, the driving-wheel and crank; D, the dasher and pinion bevel-wheel.

E are the breakers, and extend down from the lid into the cream-vessel; F, a step in the bottom of the vessel A, acting as a gudgeon for the pin of the dasher-shaft; $c$, a breaker formed on one of the inner sides of the cream-vessel.

It will be seen that the vessel A is made of earthenware, and is made of a square form, but a round bottom, and round or flaring where the corners would be if the bottom were square, thus agitating the cream greatly.

In the operation of my invention, the cream being placed in the vessel the crank is made to revolve. The shape of the dasher-blades and their inclined position to the bottom when revolving is such as to give a lifting and revolving motion to the cream, while the shape of the cream-vessel further assists in lessening the time usually required to churn, for the cream when driven by the dasher against the breakers E and $c$ and from side to side and corner to corner of the cream-vessel is very greatly agitated.

It is found by experience that vessels intended for holding milk and cream should be made of crockery or earthenware, for that is more easily cleansed and kept sweet than anything else, and for this great advantage I use it in making my churn.

Having thus fully described the construction and operation of my invention, what I claim as new, and desire to secure by Letters Patent, is—

The cream-vessel constructed round at the bottom as high up as the height of the dashers, with the rest of the body of the vessel square, and this in combination with the revolving dasher, operating as set forth, and for the purposes described.

In testimony whereof I hereunto set my hand this 28th day of February, 1861.

THOS. R. MARKILLIE.

Witnesses:
N. M. KNAPP,
S. W. PUFFER.